Nov. 23, 1965 E. LUDLOW ETAL Re. 25,909
SOUND ATTENUATING GAS CONDUIT
Original Filed July 17, 1961 3 Sheets-Sheet 1
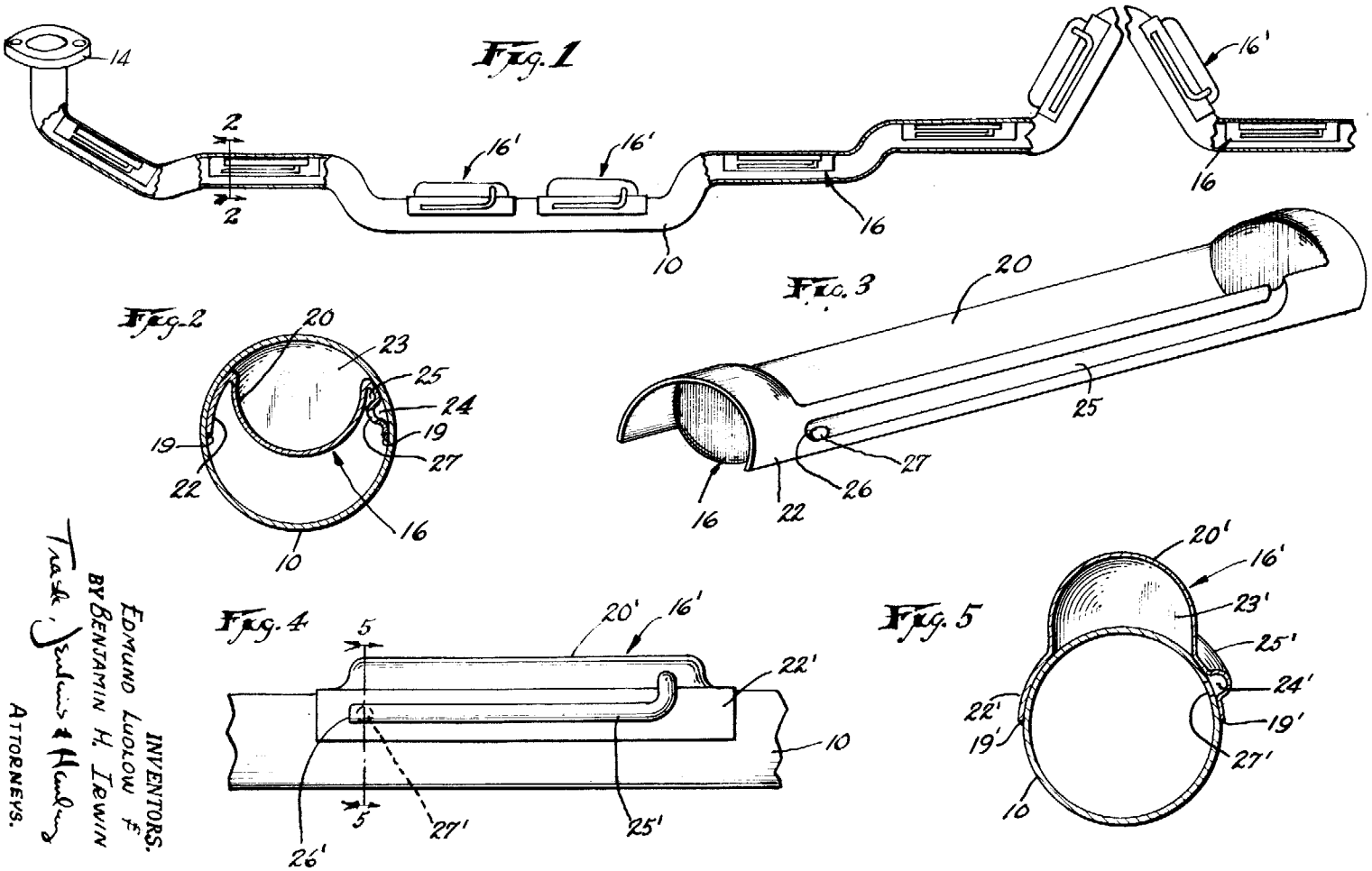
INVENTORS.
EDMUND LUDLOW &
BY BENJAMIN H. IRWIN
Trask, Jenkins & Hanley
ATTORNEYS.

SOUND ATTENUATING GAS CONDUIT

Original Filed July 17, 1961 3 Sheets-Sheet 2

INVENTORS.
EDMUND LUDLOW &
BY BENJAMIN H. IRWIN
Trask, Jenkins & Hanley
ATTORNEYS.

SOUND ATTENUATING GAS CONDUIT

Original Filed July 17, 1961 3 Sheets-Sheet 3

INVENTORS.
EDMUND LUDLOW &
BY BENJAMIN H. IRWIN
Trask, Jenkins & Hanley
ATTORNEYS.

United States Patent Office

Re. 25,909
Reissued Nov. 23, 1965

25,909

SOUND ATTENUATING GAS CONDUIT

Edmund Ludlow and Benjamin H. Irwin, Columbus, Ind., assignors to Arvin Industries, Inc., Columbus, Ind., a corporation of Indiana Original No. 3,118,517, dated Jan. 21, 1964, Ser. No. 124,677, July 17, 1961. Application for reissue Sept. 14, 1964, Ser. No. 410,336
20 Claims. (Cl. 181—59)

Matter enclosed in heavy brackets [ ] appears in the original patent but forms no part of this reissue specification; matter printed in italics indicates the additions made by reissue.

This invention relates to a sound attenuating gas conduit for conveying, and attenuating the noise level of, a moving gas stream, and which is well adapted for use with an internal combustion engine for conveying the exhaust gases therefrom and silencing the noise level of said exhaust gases.

It is an object of our invention to provide such a sound attenuating gas conduit which will meet limited space requirements, which can be easily manufactured largely from inexpensive metal-tubing and sheet-metal stampings, and which can be of light weight construction with its weight substantially uniformly distributed along its length. It is a further object of our invention to provide a sound attenuating gas conduit which can have a plurality of bends along its length, and which will create minimal back pressures. It is a further object of our invention to provide such a sound attenuating gas conduit which can be made to effect sound attenuation over a wide range of frequencies, which can be made to remain substantially in tune with said frequencies irrespective of temperature changes of the gas stream in which the sound waves are carried. It is still a further object of our invention to provide such a sound attenuating gas conduit which will be less susceptible to certain types of corrosion than conventional gas-silencing systems, and which may employ replaceable sound attenuating units.

It is a special object of our invention to provide a sound attenuating gas conduit for the exhaust gas stream of an automotive vehicle, which will eliminate the need for the bulky, expensive, and troublesome mufflers which are required in conventional automotive exhaust-silencing systems.

We have discovered that it is possible to attenuate the noise level of individual sound frequencies by suitably located tuned elements of much smaller physical size than the structures required in prior muffler-type systems, and that such elements used in combination can provide a complete and practical automotive exhaust silencing system within the general configuration of a simple pipe extending from the usual automotive engine to the usual point of discharge of the exhaust gases.

In such applications as automotive exhaust silencing, our invention contemplates a system embodying a conduit having a number of silencing elements in interrelated arrangement used in the absence of other silencing means. However, if desired, our conduit employing one or more silencing elements may be used in combination with other silencing means.

In accordance with our invention as applied to an automotive exhaust system, the exhaust manifold is connected to a pipe to convey the exhaust gases to the desired discharge point, as at the rear of the vehicle. Acoustically, such pipe, usually with at least part of the exhaust manifold, forms a conduit in which the exhaust sound produces standing wave pressure patterns, wherein each of the several harmonic components of the standing wave has one or more distinct pressure points, that is, points of maximum sound pressure which are located at particular locations along the conduit. In accordance with the preferred form of our invention, sound attenuating elements are placed in operative association with the exhaust gases at or adjacent to these pressure points, and are respectively made to attenuate the particular harmonic frequencies or bands of frequencies having pressure points at or adjacent such locations.

The silencing elements are secured directly to the pipe, and form with said pipe resonator cavities or volumes and resonator throats acoustically coupling said volumes with the gas stream. The silencing elements may be mounted externally or internally of the pipe, and in many systems it will be desirable to use a combination of elements mounted both externally and internally of the pipe. Where such silencing elements are mounted internally of the pipe, their presence in the gas stream produces a series of impedance changes creating turbulent areas in the gas stream which effect a degree of sound wave cancellation to thus reduce the amount of attenuation that must be produced by the resonator throats and cavities. Further, the internally mounted elements are in direct thermal coupling relationship with the gas stream so that changes in the temperature of the gas stream will cause corresponding temperature changes in the silencing elements. Thus, when the frequencies of the gas sound waves in the gas stream change due to changes in the temperature of said gas stream, the frequency responses of the silencing elements will undergo a corresponding change so that said silencing elements remain relatively in tune with the frequencies of the sound waves of the gas stream.

Conversely, the elements may be mounted externally of the pipe which, of course, facilitates their mounting on the pipe and permits them to be easily mounted on both the curved and straight pipe sections. In addition, such external mounting of the silencing elements precludes the possibility of their creating a back pressure within the pipe.

Other objects and features of our invention will become apparent from the more detailed description which follows and from the accompanying drawings, in which:

FIG. 1 is a fragmentary isometric view with portions thereof broken away and showing a sound attenuating exhaust system embodying our invention, such system embodying silencing elements like those shown in FIGS. 2–5;

FIG. 2 is an enlarged vertical section taken on the line 2—2 of FIG. 1;

FIG. 3 is an isometric view of the silencing element shown in FIG. 2;

FIG. 4 is a side elevation of a sound attenuating conduit having a different form of silencing element.

FIG. 5 is an enlarged vertical section taken on the line 5—5 of FIG. 4;

Figure 6:
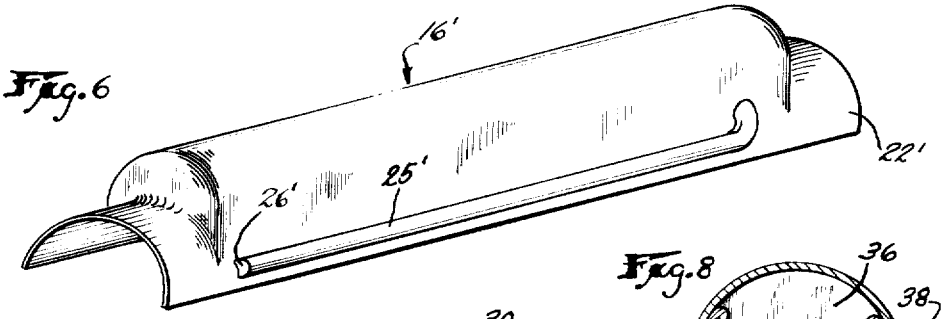
FIG. 6 is an isometric view of the silencing element shown in FIG. 5.

Our invention is particularly well adapted for use with an internal combustion engine in an automobile to attenuate the noises resulting from the operation of said engine and to convey the engine exhaust gases to a suitable discharge point. In such usage, it completely replaces a conventional exhaust system in which all of the silencing effect is lumped in specific locations determined by the structural requirements of the vehicle, as a muffler connected between an exhaust pipe joined to the exhaust manifold of the engine and a tail pipe leading from the muffler to a gas discharge point. Such a muffler conventionally comprises an outer shell having an elliptically or circularly shaped cross-section many times larger than the cross-sections of the exhaust and tail pipes, and has a relatively small number of large resonators each adapted to attenuate a wide band of sound frequencies in the exhaust gases passing through the system. In such mufflers there are normally provided two large resonator chambers respectively tuned to attenuate the harmonic frequencies of the exhaust and tail pipes. All of the resonator chambers are baffled one from another, and are arranged within the muffler shell in staggered patterns which, combined with the large size of the resonator chambers for the exhaust and tail pipes, results in the muffler being large and difficult to mount in the limited space available on the underside of an automotive vehicle.

Our invention, however, avoids the need for such large mufflers in specific locations by the employment of small silencing elements mounted on a pipe extending from the manifold to the gas discharge point. The different silencing elements may be designed to attenuate different and/or overlapping bands of wave frequencies and may be located on said pipe with respect to the harmonic characteristics of the pipe so that they will effect sound attenuation without the use of large bulky resonator chambers, as are required in a conventional muffler-type system.

Our silencing elements comprise a plurality of sheet-metal stampings which, when mounted either internally or externally on a pipe, form with said pipe a plurality of resonators. Each of said resonators comprises a volume and a throat operatively interconnecting said volume with the gas stream whereby said resonator will attenuate the noise level of the exhaust gases moving through said pipe. Because our silencing elements are formed as relatively small sheet-metal stampings, the overall weight of the system will be minimized, as will the cost of such system. Further, each of the silencing elements is formed as a relatively small unit, and in the case of the externally mounted elements, they may be easily mounted on the pipe in substantially any desired location, including the curved portions of said pipe. The small size of the silencing elements also permits them to be mounted on the pipe in any desired circumferential position to thus obviate mounting them on the bottom of the pipe in a position in which they would trap condensed corrosive materials. As will be obvious, when the silencing elements are mounted externally on the pipe, they will not create any back pressures within said pipe, thus permitting a smaller diameter pipe to be employed to reduce both the weight and cost of the system. However, such externally mounted elements, not being physically located in the gas stream, will not be thermally coupled to said gas stream to the same degree as the internally mounted elements, and thus will not remain in tune with the sound wave frequencies which they are tuned to attenuate to the same degree as if they were mounted internally of the pipe.

In the case of the internally mounted silencing elements, the elements are in direct thermal-coupling relationship with the exhaust gases passing through said pipe. The frequencies of the sound waves in the exhaust gases will vary with temperature changes in said gas stream, but with the silencing elements mounted internally of the pipe, the silencing elements will assume the temperature changes of the gas stream and will substantially remain in tune with the sound wave frequencies which they were tuned to attenuate irrespective of the temperature of the gas stream. Like the external elements, the silencing elements mounted internally of the pipe may be mounted on said pipe in positions such that they will not tend to trap any corrosive liquids condensed out of the gas stream.

In the operation of a conventional internal combustion engine in an automobile, the combustion of fuel within the cylinders produces a substantial volume of hot exhaust gases which are exhausted with substantial noise into the exhaust manifolds mounted on the engine in communication with the cylinder exhaust ports. The frequencies of the sound waves in such exhaust gases extend over a wide range, such as from about 30 cycles per second to about 5,000 cycles per second, with the lower frequencies largely representing the fundamental and lower harmonics determined by the length of the exhaust conduit. In many exhaust systems it is the lower range of frequencies, i.e., frequencies below 200 cycles per second, that are the most difficult to attenuate and produce the most objectionable noises, especially since it is in this low frequency range that the firing frequencies of the engine coincide with and augment the natural resonant frequencies of the exhaust system itself.

The lower frequencies are particularly difficult to silence when the engine is propelling the vehicle at a rate of speed of from about 20 miles per hour to about 50 miles per hour. At these speeds most engines fire at frequencies below 200 cycles per second, the range in which the fundamental and first overtone of substantially all silencing systems fall. Generally, if the engine is propelling the automobile at a speed slower than about 20 miles per hour, its firing frequencies will be well below the fundamental frequency of the silencing system and thus will not coincide with nor augment the natural resonant frequency of the exhaust system itself to any appreciable extent. And if the engine is propelling the automobile faster than about 50 miles per hour, its firing frequencies will generally be higher than the first overtone of the exhaust system. Also, the natural road noises at these higher speeds are more predominant than the exhaust gas noises.

In many conventional mufflers these lower frequencies are quite difficult to attenuate because the large size of the mufflers prevents them from being positioned in the exhaust system on the under-side of the vehicle to act upon and attenuate these low frequencies.

Our invention is adapted to attenuate the exhaust noises incident to the operation of an internal combustion engine over a wide range of sound wave frequencies, including the troublesome frequencies below 200 cycles per second, by passing the exhaust gases of said engine through an exhaust conduit having a plurality of silencing elements mounted along its length. The silencing elements may be tuned to attenuate different and overlapping bands of frequencies. While silencing elements in accordance with our invention may be used alone to effect attenuation of the exhaust gas noises, they may be used in combination with conventional mufflers, or may be incorporated within otherwise conventional mufflers as acoustical muffler components, or used in combination with acoustical liners employed in the manifold or in the exhaust conduit itself.

The embodiment shown in FIG. 1 comprises a pipe 10 adapted to be connected at one end to an exhaust manifold of an internal combustion engine by a conventional mounting flange 14 with its opposite end open to the atmosphere. Conveniently, the pipe 10 may have a diameter in the same range as the diameters of the exhaust and tail pipes used in conventional exhaust systems. For example, it may have a diameter of about one and three-quarters to two and one-half inches, the diameters normally used in conventional exhaust pipes and tail pipes on automobiles; but it may have a larger diameter, say as large as four inches, the diameter of conventional exhaust and tail pipes in trucks, busses, and other large vehicles. The pipe 10 may be a unitary length, as illustrated, or it may be in the form of a plurality of short interconnected lengths of pipe to facilitate assembly and/or replacement.

In the exhaust system illustrated in FIG. 1, a plurality of silencing elements 16 are mounted on the inside of the pipe 10, and a plurality of silencing elements 16' are mounted on the outside of said pipe. The elements 16 and 16' may be mounted on the pipe at various positions along its length and at various positions about its circumference. Of course, when the elements are mounted on the upper portion of the pipe, they will have a reduced tendency to trap corrosive liquids condensed out of the gas stream thereby giving them an increased effective life.

As shown in FIGS. 2 and 3, each of the elements 16 is formed as a unitary sheet-metal stamping and comprises a central concavity 20 having a peripherally extending flange 22 projecting outwardly therefrom. The flange 22 abuts, and is rigidly secured to, the inner face of the pipe 10 as by welding, brazing, or the like, as at 19, to form a gas-tight seal extending around the concavity 20. In this manner, the concavity 20 and the portion of the pipe 10 overlying said concavity form a resonator volume indicated at 23. The volume 23 is operatively associated with the gas steam moving through the pipe 10 by a resonator throat 24 which is formed by a bead 25 formed in the stamping within the extent of the flange 22 and that portion of the pipe 10 overlying said bead. One end of said bead is in open communication with the volume 23 and the opposite end of said bead is closed, as at 26. An opening 27 is formed in the bead 25 to operatively interconnect the throat to the gas stream moving through said pipe so that the resonator will attenuate the noise level of the sound waves in the exhaust gases.

As shown in FIGS. 4–6, the silencing elements 16' which are mounted on the outside of the pipe 10 are inverted versions of the silencing elements 16. Each of the elements 16' is formed from a sheet-metal stamping and comprises a central concavity 20' having a peripherally extending flange 22' projecting outwardly therefrom. The flange 22' abuts, and is rigidly secured to, the outer face of the pipe 10, as at 19', to form a gas-tight seal extending around the concavity 20', so that said concavity and the portion of the pipe lying thereunder form a resonator volume indicated at 23' in FIG. 5. Said volume is operatively associated with the gas stream moving through the pipe 10 by a resonator throat 24' which is formed by a bead 25' formed in the stamping within the extent of the flange 22' and that portion of the pipe 10 underlying said bead. One end of the bead 25' is in open communication with the volume 23' and the opposite end of said bead is closed as at 26'. An opening 27' is formed in the pipe 10 within the extent of the bead 25' to interconnect the throat to the gas stream so that the resonator will attenuate the noise level of the sound waves in the exhaust gases.

In order that the system of resonators will attenuate a substantial range of sound wave frequencies in the exhaust gases, it is necessary that the individutl resonators be tuned with respect to the harmonic characteristics of the exhaust conduit and/or the firing frequencies of the engine. The latter, at least in the troublesome range below 200 cycles per second, normally are correlated with the former so that in most instances the resonators are tuned to frequencies which constitute multiples of fundamental resonant frequency of the conduit. Such multiples may constitute whole number multiples (for example, 1, 2, 3, etc.) in which case the resonators will be tuned to the various harmonics of the conduit, and such multiples may also constitute mixed number multiples (for examples, 1½,2½, etc.) in which case the resonators will be tuned to fractional components of the conduit harmonics. Desirably, the resonators are tuned to both the whole number multiples and mixed number multiples of the fundamental resonant frequency of the conduit, and are thus correlated with, and responsive to, both the harmonic conduit frequencies and the firing frequencies of the engine when said engine is propelling a vehicle at speeds in the range of from about 20 m.p.h. to about 50 m.p.h.

Tuning of the resonators may be effected by adjusting the conductivity of the resonator throat with respect to the size or capacity of the resonator volume. The formula for calculating such tuning may be represented by the formula:

$$f=\frac{C}{2\pi}\sqrt{\frac{C_o}{V_c}}$$

where f is the frequency to which the resonator is to be tuned, C is the speed of sound in inches per second at the temperature of the medium, $V_c$ is the capacity of the resonator volume, and $C_o$ is the conductivity of the resonator throat calculated from the formula:

$$C_o=\frac{2\pi r^2}{2h+\pi r}$$

where r is the radius of the throat and h is the length of the throat. Where the throats are non-circular, as in the case of the silencing elements 16 and 16', their conductivity may be calculated by the above formula using their cross-sectional area instead of quantity $\pi r^2$, and the mean radius of their cross-section instead of the quantity $\pi r$. While each resonator attenuates to a maximum degree the particular frequency to which it is tuned, it will, of course, attenuate to a lesser extent a limited band of frequencies on either side of that particular frequency, and will effect some attenuation of substantially all frequencies.

The fundamental resonant frequency of the exhaust conduit with which the frequency of the resonators are to be co-ordinated depends upon the speed of sound, and as shown by the first formula set forth above, the frequency of a resonator likewise depends upon the speed of sound. Since the speed of sound varies with temperature, a temperature gradient between the resonator throats and exhaust gases will interfere with the co-ordination necessary for the resonators to achieve their maximum attenuation. These changes in the speed of sound resulting from changes in temperature of the medium in which the sound waves are carried will also cause the frequencies of the sound waves to change, the degree of frequency change depending upon the temperatures and frequencies involved. In our exhaust conduit, the temperature of the exhaust gases in the engine to which the conduit is connected will vary over a wide temperature range of from about 200° F., when the engine is cold, to a temperature of about 1,700° F., when the engine is hot.

In a typical example of our invention using an exhaust conduit having a first overtone (second harmonic) of 80 cycles per second, we have found that that first overtone shifted to 106 cycles per second when the engine was propelling the vehicle 25 miles per hour, and that it was shifted to 121 cycles per second when the engine was propelling the vehicle 50 miles per hour. This frequency shifting resulted from the increased temperatures of the exhaust gases. Furthermore, at 25 miles per hour the engine had a firing frequency of about 80 cycles per second, and a firing frequency of 120 cycles per second at 50 miles per hour. As will be apparent, in the lower frequency range, i.e., below 200 cycles per second, the firing frequencies of the engine coincide with and augment the natural resonant frequencies of the exhaust conduit making these lower frequency ranges extremely difficult to attenuate.

Thus, the silencing elements 16, which are mounted within the pipe 10, have their throats directly thermally coupled to the gas stream so that they are subjected to the same temperature changes as the gas stream at the points where said silencing elements are located in said gas stream. This maintains the temperature gradient between the gas stream and the resonators at a minimum, irrespective of gas stream temperature changes, and the resonators will thus remain co-ordinated with the resonant harmonic pipe frequencies which they are to attenuate. The throats 24' of the elements 16', however, which are mounted on the outside of the pipe 10 are not in such close thermal coupling with the gas stream. Further, their external mounting causes them to be subjected to air wash during movement of the vehicle. Thus, the external elements 16' do not remain co-ordinated with the resonant harmonic pipe frequencies to which they are tuned to the same degree as the internally mounted elements 16. However, it is possible to approximate the temperature of the exhaust gas stream in the pipe 10 at the positions at which the elements 16' are mounted on the pipe so that said elements may be tuned to effect a high degree of attenuation irrespective of a temperature gradient which may exist between their throats 24' and the gas stream at the points where their throats are connected thereto.

Preferably, the resonators formed by the elements 16 and 16' are respectively tuned to attenuate the objectionable harmonics, or fractional components of said harmonics, in the gases in the conduit. Each of these harmonic components will have specifically located maximum sound-pressure points along the length of the conduit, the number of such pressure points and their location being a function of the particular harmonic component involved. For example, the second overtone (third harmonic) will have three maximum pressure points along the conduit which will occur at points spaced from either end of the conduit by distances of one-sixth, one-half, and five-sixths of the conduit-length. Each of the resonators will attenuate to the maximum degree the particular harmonic, or fraction of a harmonic, to which it is tuned, if its throat opening is coupled to the gas stream at one of the points of maximum pressure of the harmonic or harmonic fraction for which it is tuned. While the resonators will effect maximum attenuation while their throats are located precisely at their maximum pressure points, they will, of course, still operate at high attenuation efficiencies, if their throats are located adjacent such pressure points. For example, we have found that a resonator will operate at not less than 90% efficiency if its throat opening is placed at any point within a distance from the true maximum pressure point equal to one-twentieth of the length of the sound wave producing the pressure point.

In general, such maximum pressure points are spaced from an end of the conduit by fractions L of the conduit-length according to the formula:

$$L=\frac{2m-1}{2n}$$

where n is the harmonic number for which the resonator is tuned, and m is every integer between and including 1 and n.

The above formula is used for calculating the locations of the various sound pressure points when the conduit and the exhaust gases moving therethrough are at ambient temperatures. However, when the engine connected to the conduit is in operation under normal conditions of use, it will discharge gases into the conduit at elevated temperatures thereby increasing the temperature of the conduit and increasing the velocity of the sound waves carried in said gases to shift the locations of the pressure points as calculated from the above formula. When the engine is operating under normal conditions, the locations of the pressure points shift downstream a distance equal to from about 2% to about 4% of the wave length of the frequencies producing the various pressure points. The temperature gradient along the conduit from the exhaust manifold on the engine to the discharge end of said conduit is not uniform, and the locations of the pressure points toward the upstream end of the conduit will be shifted downstream to a greater degree than the locations of the pressure points toward the discharge end of the conduit. Thus, the resonators are tuned to attenuate the desired sound wave frequencies in the gases in the conduit and the above formula is employed to determine the positions that the resonator throats should open into the conduit. However, for the resonators to achieve maximum effectiveness, the resonators are mounted on the conduit with their throats opening into the conduit at points spaced downstream from the locations calculated by said formula by distances equal to about 2% to about 4% of the wave length of the frequencies to which the resonators are tuned.

In most systems for use in attenuating the exhaust noises of an internal combination engine it is preferable to employ a plurality of resonators with the bulk of the attenuating capacity of said resonators tuned to attenuate frequencies within a range lying between and including the fundamental and third overtone of the conduit. With the bulk of the attenuation occuring in the range, the two most generally troublesome pipe harmonics will be attenuated, as will the most predominate and troublesome firing frequencies of the engine, which firing frequencies occur when the engine is propelling the vehicle at speeds in the range of from about 20 m.p.h. to about 50 m.p.h. The remainder of the resonators may be tuned to attenuate the higher frequencies so that the system of resonators effects an attenuation of the entire range of frequencies of the sound waves created by the operation of the engine.

Because of their internal mounting, the silencing elements 16 are normally mounted only in the straight sections of the pipe 10, but the maximum pressure point of a particular frequency may be in a curved section of the pipe. In such a situation, it may be more convenient to employ an externally mounted silencing element 16', since the elements 16', because of their external mounting, lend themselves better to being mounted on curved pipe sections than do the internally mounted elements 16.

Both the externally and internally mounted silencing elements have their own respective advantages and limitations, and generally speaking, one is not to be considered as preferred over the other. For example, the throats of the internally mounted elements are in intimate acoustic and thermal coupling with the gas stream which causes the internally mounted elements to effect a greater degree of attenuation per unit of resonator volume capacity than the externally mounted elements. Their more intimate thermal coupling with the gas stream also causes their frequency response (tuning) to shift with frequency changes of sound waves to a greater degree than the externally mounted elements which are somewhat thermally isolated from the gas stream and are subjected to air wash during vehicle movement. The externally mounted elements, on the other hand, may be mounted more easily on the curved sections of the conduit than the internally mounted elements, and it frequently occurs that a maximum sound pressure point will lie in such a curved conduit portion. Being disposed outside the gas stream, the externally mounted elements do not create any back pressures whatsoever within the conduit and frequently permit the use of a smaller diameter conduit than may be employed with either the internally mounted elements or conventional exhaust systems using mufflers. Thus, while a system employing wholly externally or wholly internally mounted silencing elements will effect the necessary exhaust gas noise attenuation, it is frequently desirable to employ a system using both internally and externally mounted elements.

An additional advantage in the use of a combination of internally and externally mounted elements is seen in that it may occur that a single resonator will not sufficiently attenuate a particular frequency. In which case, it may be desirable to mount a pair of silencing elements 16 and 16' in axial positions along the length of the pipe 10 so that both of their throats open into said pipe adjacent the pressure point of the frequency to which the two silencing elements are tuned. As will be apparent, such a dual mounting of the silencing elements 16 and 16' will permit two silencing elements to be mounted on the pipe 10 at each pressure point. Although the two elements in such a dual mounting are to attenuate the same frequency, their throat and volume sizes will be sufficiently different such that they are tuned to two different frequencies. The external element 16', which is not as responsive to the temperature changes of the gas stream will be of a size and configuration such that it is tuned to a higher frequency than the element 16 whose frequency response (tuning) will change directly with changes in the frequency of the harmonic which it is to attenuate, such change occurring with the temperature changes of the exhaust gases.

Figure 7:
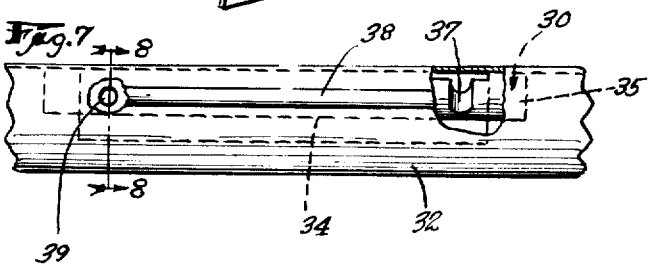
FIG. 7 is a side elevation partially broken away and showing a sound attenuating conduit having a different form of silencing element.
Figure 8:
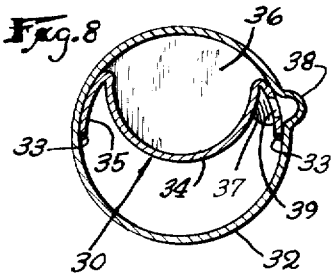
FIG. 8 is an enlarged vertical section taken on the line 8—8 of FIG. 7.
Figure 9:
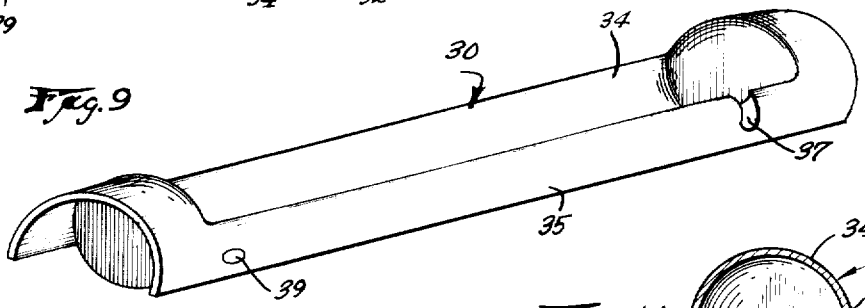
FIG. 9 is an isometric view of the silencing element shown in FIG. 8.

As shown in FIGS. 7–9, a silencing element 30 constituting a different embodiment of the silencing element 16 is mounted in a pipe 32. The silencing element 30 is formed from a unitary sheet-metal stamping and is provided with a centrally disposed concavity 34 having a peripheral flange 35 projecting outwardly therefrom and rigidly secured to the inner face of the pipe 32, as at 33, to form a gas-tight seal extending around the concavity 34. In this manner, the concavity 34 and the portion of the pipe overlying said concavity 34 form a resonator volume indicated at 36. The volume 36 is operatively associated with the gas stream moving through the pipe 32 by a resonator throat. Said throat is formed by a beaded extension 37 of the concavity 34 formed in the flange 35 and by an outwardly projecting bead 38 formed in the pipe 32. The pipe bead 38 is formed within the extent of the flange 35, with one of its ends being closed and its opposite end terminating within the extent of the bead 37. An opening 39 is formed in the flange 35 within the extent of the pipe bead 38 to operatively interconnect the throat formed by the beads 37 and 38 and the portions of the pipe and flange 35 in alignment with said beads to the gas stream moving through the pipe 32 so that the resonator will attenuate the noise level of the sound waves in the exhaust gases.

Figure 10:
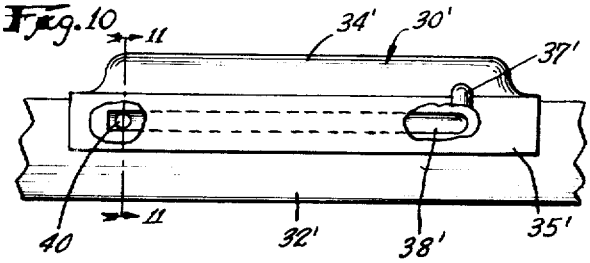
FIG. 10 is a side elevation partially broken away and showing a sound attenuating conduit having a different form of silencing element.
Figure 11:
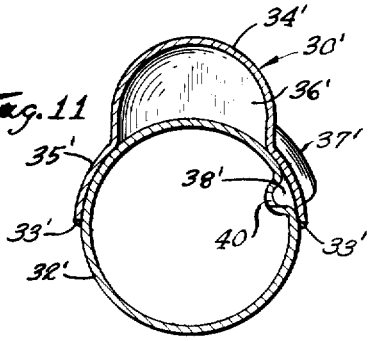
FIG. 11 is an enlarged vertical section taken on the line 11—11 of FIG. 10.
Figure 12:
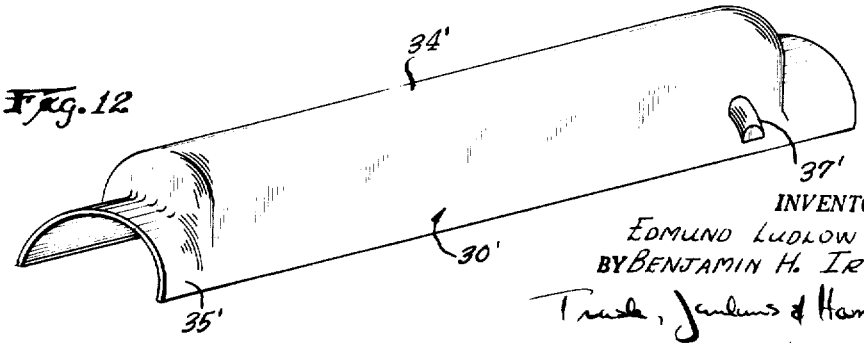
FIG. 12 is an isometric view of the silencing element shown in FIG. 10.

A silencing element 30' constituting an inverted version of the element 30 is illustrated in FIGS. 10–12. The silencing element 30' is mounted on the exterior of a pipe 32', and comprises a stamping provided with a centrally disposed concavity 34' having a peripherally extending flange 35' projecting outwardly therefrom and secured to the outer face of the pipe 32', as at 33'. Thus, the concavity 34' and the portion of the pipe 32' underlying said concavity form a resonator volume indicated at 36'. The volume 36' is operatively connected to the gas stream by a throat formed by an outwardly projecting bead 37' formed in the flange 35' and constituting an extension of the concavity 34' and by an inwardly projecting bead 38' formed in the pipe 32' within the extent of the flange 35, one end of the pipe bead 38' terminating within the extent of the bead 37' and the opposite end of said bead being open to the gas stream as at 40. Thus, the beads 37' and 38' and the portions of the flange 35' and the pipe 32' in alignment therewith form an elongated throat operatively interconnecting the volume 36' with the gas stream so that the resonator will attenuate the noise level of the sound waves in the exhaust gases.

Figure 13:
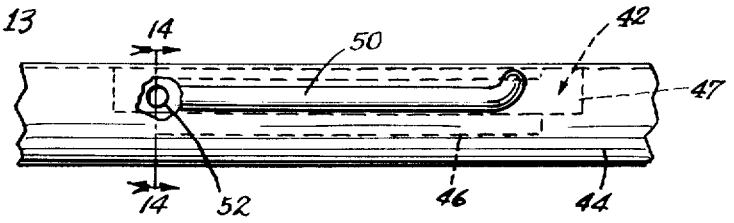
FIG. 13 is a side elevation partially broken away and showing a sound attenuating conduit having a different form of sound attenuating element.
Figure 14:
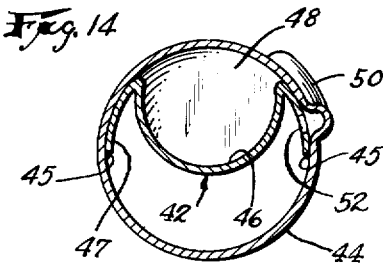
FIG. 14 is an enlarged vertical section taken on the line 14—14 of FIG. 13.

A different embodiment of our silencing element construction is illustrated in FIGS. 13 and 14. The silencing element 42 shown in FIG. 14 formed as a unitary sheet-metal stamping is mounted on a pipe 44. Said element is provided with a centrally disposed concavity 46 having a peripheral flange 47 projecting outwardly therefrom and rigidly secured to the inner face of the pipe 44, as at 45, to form a gas-tight seal extending around the periphery of said concavity. In this manner, the concavity 46 and the portion of the pipe 44 overlying said concavity form a resonator volume indicated at 48. The volume 48 is operatively connected with the gas stream moving through the pipe 44 by a resonator throat formed by an outwardly projecting bead 50 formed in the pipe 44 and the portion of the flange 47 underlying said bead. Said throat is in open communication with the gas stream and the volume 48 by an opening 52 formed in the flange 47 within the extent of the bead 50, and by a curved portion of the bead 50 which is in open communication with the volume 48. In this manner, there is a continuous flow passage from the opening 52 through the throat into the resonator volume 48, whereby the resonator will attenuate the noise level of the exhaust gases moving through the pipe 44.

Figure 16:
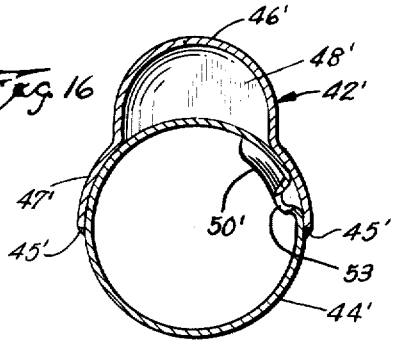
FIG. 16 is an enlarged vertical section taken on the line 16—16 of FIG. 15.
Figure 15:
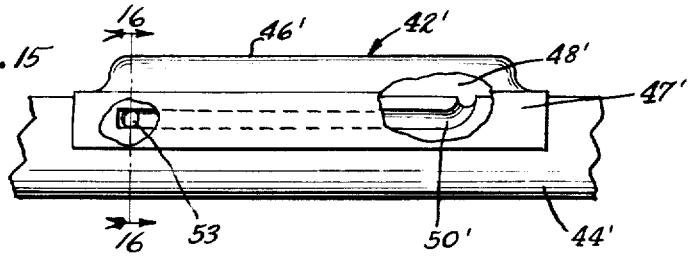
FIG. 15 is a side elevation partially broken away and showing a sound attenuating conduit having a different form of silencing element.

A silencing element 42' constituting an inverted version of the element 42 is illustrated in FIGS. 15 and 16. The element 42' is formed from a unitary sheet-metal stamping and is provided with a centrally disposed concavity 46' having a peripheral flange 47' projecting outwardly therefrom and rigidly secured to the outer face of an exhaust gas-carrying pipe 44', as at 45', to form a gas-tight seal extending continuously around the concavity 46'. Thus, the concavity 46' and the portion of the pipe 44' lying thereunder form a resonator volume indicated at 48'. The volume 48' is operatively interconnected with the gas stream flowing through the pipe 44' by a resonator throat formed by an inwardly projecting bead 50' formed in the pipe 44' and the portion of the flange 47' overlying said bead. The throat is disposed in open communication with the interiors of the pipe 44' and the volume 48' by an opening 53 formed in the bead 50' and by one end of said bead being in open communication with the volume 48' whereby the resonator will attenuate the noise level of the exhaust gases flowing through said pipe.

The resonators formed by the element 30' shown in FIG. 10 and the element 42' shown in FIG. 15 are better adapted to remain in tune with frequencies which they are to attenuate than the element 16'. The resonator throats formed by the elements 30' and 42' have substantial portions of their extents disposed within the gas flow passage and are thus more intimately thermally coupled to the exhaust gases than the throat formed by the element 16'. This causes the throat temperatures of the elements 30' and 42' to closely follow the gas stream temperatures in the manner of the internally mounted silencing elements.

Figure 17:
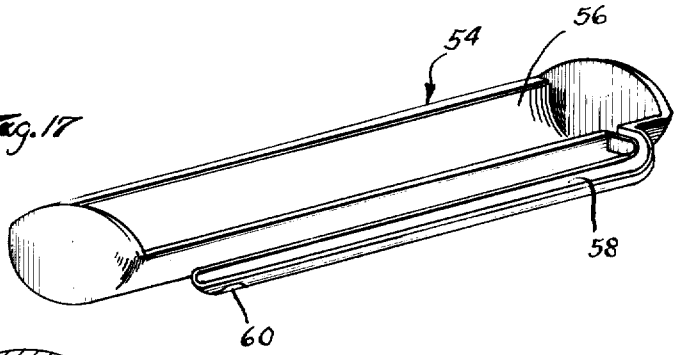
FIG. 17 is an isometric view of still another different form of our silencing element.
Figure 18:
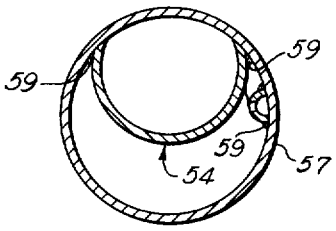
FIG. 18 is a vertical section through a gas-carrying pipe having the silencing element shown in FIG. 17 mounted therein.

FIG. 17 illustrates a modified form of the silencing element 16 shown in FIG. 3, and differs therefrom in the elimination of the flange 22. In the embodiment shown in FIG. 17, there is provided a sheet-metal stamping 54 having an enlarged concavity 56 and a smaller concavity 58 forming an integral extension of said concavity 56. As will be apparent, the element 54 may be mounted on the interior of a gas-carrying pipe 57 by brazing or otherwise securing the peripheral edges thereof to the inner face of said pipe, as at 59. In this manner, the concavity 56 and the overlying portion of the pipe to which the element is secured form a resonator volume, and the smaller concavity 58, together with its overlying pipe portion, form a resonator throat. The concavity 58 being in open communication with the concavity 56, and being provided with an opening 60, will thus dispose the resonator volume in operative communication with the exhaust gases flowing through the pipe in which the element 54 is mounted. Of course, this same principle may be applied for mounting an element like that illustrated in FIG. 17 on the exterior of a gas-carrying pipe, it merely being necessary to change the contour of the peripheral edges of the element 54 so that they will mate with and abut the outer contour of said pipe to form a gas-tight seal therewith.

Each of the silencing elements illustrated is provided with a relatively long resonator throat. It is to be understood, however, that the throats employed in our silencing elements may have any desired length depending upon the frequency which they are to attenuate. Thus, the throats may have relatively long lengths and/or large cross-sections for attenuating the low sound wave frequencies and relatively short lengths and/or small cross-sections for attenuating high sound wave frequencies. It is also within the spirit and scope of our invention to employ more than a single throat in association with a single volume, if the use of a resonator having such a multiplicity of throats is deemed desirable.

While we have shown our silencing elements as mounted on or within a gas-carrying pipe having a circular cross-section, it is to be understood that said pipe may have any desired cross-sectional configuration. Indeed, in certain applications, it may be desirable for purposes of vertical clearance to flatten such gas-carrying pipe into a generally elliptical cross-section. In such instances, it is merely necessary to alter the configuration of the silencing elements so that they will mate with the walls of said pipe to form gas-tight seals around the peripheries of the resonator volumes and throats.

For purposes of simplicity of description, we have only described our invention for use in an exhaust system for an engine. However, it may, of course, also be used on the intake side of an internal combustion engine for transporting and silencing the gas intake flow to the engine, or for many other silencing applications.

We claim as our invention:

1. In a sound attenuating gas conduit for conveying, and attenuating the noise level of, a moving gas stream, a pipe forming a gas-flow passage, at least one silencing element secured to the wall of said pipe and comprising a member having a concavity formed therein and enclosed by the portion of the pipe in alignment therewith to form a resonator volume, a peripheral flange on said member extending around said concavity and rigidly secured to said pipe, aligned portions of said flange and pipe being spaced from each other to form a resonator throat disposed in open communication with said gas-flow passage and resonator volume, whereby said silencing element will attenuate the noise level of the gas stream moving through said gas-flow passage.

2. In a sound attenuating gas conduit for conveying, and attenuating the noise level of, a moving gas stream, a pipe forming a gas-flow passage, at least one silencing element secured to the wall of said pipe and comprising a sheet-metal stamping having a generally centrally disposed concavity formed therein and enclosed by the portion of the pipe in alignment therewith *to form a resonator volume,* a peripheral flange on said stamping extending around said concavity and rigidly secured to said pipe to form a substantially continuous gas-tight seal around said volume, aligned portions of said flange and pipe being spaced from each other to form a resonator throat disposed in open communication with said gas-flow passage and resonator volume, whereby said silencing element will attenuate the noise level of the gas stream moving through said gas-flow passage.

3. In a sound attenuating conduit for conveying and attenuating the noise level of, a moving gas stream, a pipe forming a gas-flow passage, at least one silencing element secured to said pipe and having a concavity formed therein and enclosed by the portion of the pipe in alignment therewith to form a resonator volume, and means projecting outwardly from said concavity and having a first portion operatively joined to said pipe and a second portion in spaced relation to said pipe to form therewith a resonator throat, said throat being in open communication with said gas-flow passage and resonator volume whereby said silencing element will attenuate the noise level of the gas stream moving through said gas-flow passage.

4. The invention as set forth in claim 3 in which said means comprises a flange projecting outwardly from said concavity and having a first wall area *comprising said first portion* connected to said pipe and second wall area *comprising said second portion* in spaced relation to the aligned portion of said pipe.

5. The invention as set forth in claim 3 in which said means comprises an elongated integral extension of said concavity in open communication therewith and connected to said pipe along its edges.

6. In a sound attenuating gas conduit for conveying, and attenuating the noise level of, a moving gas stream, a pipe forming a gas-flow passage, at least one silencing element mounted on the outer face of the pipe wall and comprising a member having a concavity formed therein and projecting outwardly from said pipe to form with the portion of the pipe disposed thereunder a resonator volume, a flange on said member projecting outwardly from said concavity and rigidly secured to the outer face of the pipe, aligned portions of said flange and pipe being spaced from each other to form a resonator throat disposed in open communication with said gas-flow passage and resonator volume, whereby said silencing element will attenuate the noise level of the gas stream moving through said gas-flow passage.

7. The invention as set forth in claim 6 in which said resonator throat is formed by an outwardly projecting bead formed in said flange and having one of its ends closed and its opposite end opening into said concavity, the portion of the pipe in alignment with said bead having an opening formed therein to operatively connect said throat to the gas-flow passage.

8. The invention as set forth in claim 6 in which said resonator throat is formed by an ouwtardly projecting bead formed in said flange and having one of its ends closed and its opposite end opening into said concavity, and an inwardly projecting bead formed in the pipe underlying said flange and having one of its ends closed and disposed in an overlapping relationship with the bead in said flange and its opposite end opening into said gas-flow passage to operatively connect the resonator throat to the gas-flow passage.

9. The invention as set forth in claim 6 in which said resonator throat is formed by an inwardly projecting bead formed in the pipe within the extent of said flange and having one of its ends terminating within the extent of said concavity, said bead having an opening formed therein to operatively connect the resonator throat to the gas flow passage.

10. In a sound attenuating gas conduit for conveying, and attenuating the noise level of, a moving gas stream a pipe forming a gas-flow passage, at least one silencing element mounted on the inner face of the pipe wall and comprising a member having a concavity formed therein and projecting inwardly from the pipe wall into said gas stream to form with the portion of the pipe disposed thereover a resonator volume, a flange on said member projecting outwardly from said concavity and rigidly secured to the inner face of the pipe, aligned portions of said flange and pipe being spaced from each other to form a resonator throat disposed in open communication with said gas-flow passage and resonator volume, whereby said silencing element will attenuate the noise level of the gas stream moving through said gas-flow passage.

11. The invention as set forth in claim 10 in which said resonator throat is formed by a closed end, outwardly projecting bead formed in said pipe within the extent of said flange and having one of its ends terminating within the extent of said concavity to operatively interconnect said throat and volume, and said flange is provided with an opening within the extent of said bead to operatively interconnect said throat and gas-flow passage.

12. The invention as set forth in claim 10 in which said resonator throat is formed by a bead formed in said flange and projecting inwardly from said pipe and having one of its ends opening into said concavity and its opposite end being provided with an opening into said gas-flow passage.

13. The invention as set forth in claim 10 in which said resonator throat is formed by a closed end, outwardly projecting bead formed in said pipe and an inwardly projecting bead formed in said flange with one of its ends being closed and disposed in an overlapping relationship with the bead in said pipe and its opposite end opening into said concavity, said flange having an opening formed therein within the extent of the bead in said pipe to operatively interconnect said throat and gas-flow passage.

14. An exhaust silencing system for an internal combustion engine, comprising a pipe for connection to the engine to receive the exhaust gases thereof and to convey such gases to a discharge point, and a plurality of axially spaced silencing elements secured to the wall of said pipe, each of said silencing elements comprising a sheet-metal stamping having a concavity formed therein and enclosed by the portion of the pipe in alignment therewith to form a resonator volume, a peripheral flange on said stamping extending around said concavity and rigidly secured to said pipe to connect said element to the pipe and form a substantially continuous gas-tight seal around said volume, aligned portions of said flange and pipe being spaced from each other to form a resonator throat disposed in open communication with the pipe interior and resonator volume to operatively interconnect said volume and the gas stream moving through said pipe for attentuating the noise level thereof, said resonator volumes and throats having pluralities of predetermined sizes to tune them to attenuate wide bands of sound wave frequencies.

15. An exhaust silencing system for an internal combustion engine, comprising a pipe for connection to the engine to receive the exhaust gases thereof and to convey such gases to a discharge point, said pipe forming a gas conduit wherein the exhaust gas sound produces one or more distinct sound-pressure points at particular locations along the conduit, and a silencing element disposed adjacent one or more of said points, said element comprising a sheet-metal stamping rigidly connected to said pipe, said element having a concavity formed therein and enclosed by the portion of the pipe in alignment therewith to form a resonator volume, means projecting outwardly from said concavity and secured to said pipe, said means having a wall area in spaced relation to the aligned portion *of* said pipe to form therewith a resonator throat disposed in open communication with said volume and with said gas conduit adjacent the pressure point of the frequency to which it and its associated volume are tuned whereby said element will preferentially attenuate the noise level of said frequency.

16. The invention as set forth in claim 15 in which said element is mounted on the outside of said pipe and said concavity projects outwardly therefrom, and said means comprises an outwardly projecting bead, the edges of which abut said pipe, said bead having one of its ends closed and its opposite end in open communication with said volume, said pipe having an opening formed therein with the extent of said bead to operatively interconnect said throat and gas-flow passage.

17. An exhaust silencing system for an internal combustion engine, comprising a pipe for connection to the engine to receive the exhaust gases thereof and to convey such gases to a discharge point, said pipe forming a gas conduit wherein the exhaust gas sound produces a plurality of sound-pressure points at particular locations along the conduit, and pluralities of silencing elements mounted internally and externally on said pipe, each of said elements comprising a sheet-metal stamping having a concavity formed therein and enclosed by the portion of the pipe in alignment therewith to form a resonator volume, means projecting outwardly from said concavity and secured to said pipe, said means having a wall area in spaced relation to the aligned portion of said pipe to form therewith a resonator throat disposed in open communication with said volume and with said gas conduit adjacent the pressure point of the frequency to which it and its associated volume are tuned whereby said element will preferentially attenuate the noise level of said frequency.

18. The invention as set forth in claim 17 in which at least one pair of said internally and externally mounted silencing elements are mounted on said pipe in positions to dispose their throats in open communication with the gas conduit at the substantially same sound-pressure point whereby both of said pair of elements will attenuate the sound wave frequency producing said pressure point.

19. The invention as set forth in claim 17 in which said pressure points have ambient temperature locations along said pipe and locations at elevated temperature conditions during operation of said engine displaced downstream therefrom by distances equal to from about 2% to about 4% of the wave lengths of the sound waves producing said pressure points, and said resonator throats are in open communication with said gas conduit at the elevated temperature locations of said pressure points.

20. An exhaust silencing system for an internal combustion engine, comprising a pipe for connection to the engine to receive the exhaust gases thereof and to convey such gases to a discharge point, said pipe forming a gas conduit wherein the exhaust gas produces standing wave pressure patterns, and a plurality of silencing elements formed from sheet-metal stampings rigidly connected to said pipe, each of said elements having a concavity formed therein and enclosed by the portion of the pipe in alignment therewith to form a resonator volume, and means projecting outwardly from said concavity and secured to said pipe, said means having a wall area in spaced relation to said pipe to form therewith a resonator throat disposed in open communication with said volume and with said gas conduit, the majority of said elements having their volumes and throats tuned to frequencies within the frequency range between and including the frequencies of the fundamental and third overtone of said standing wave pressure patterns.

References Cited by the Examiner

The following references, cited by the Examiner, are of record in the patented file of this patent or the original patent.

UNITED STATES PATENTS

| | | | |
|---|---|---|---|
| 1,910,672 | 5/1933 | Bourne | 181—48 |
| 2,099,858 | 11/1937 | MacKenzie et al. | 181—48 |
| 2,112,964 | 4/1938 | MacKenzie | 181—48 |
| 2,115,103 | 4/1938 | Haas | 181—48 |
| 2,188,202 | 1/1940 | MacKenzie et al. | 181—48 |
| 2,297,046 | 9/1942 | Bourne. | |
| 2,357,792 | 9/1944 | Powers | 181—48 |

FOREIGN PATENTS

| | | |
|---|---|---|
| 415,446 | 8/1934 | Great Britain. |

LEO SMILOW, *Primary Examiner.*

C. W. ROBINSON, ROBERT S. WARD, *Examiners.*